US010880854B2

(12) United States Patent
Zhang et al.

(10) Patent No.: US 10,880,854 B2
(45) Date of Patent: Dec. 29, 2020

(54) INTELLIGENT BASE STATION WITH CAPABILITY TO IDENTIFY THREE-DIMENSIONAL ENVIRONMENT, METHOD FOR DETERMINING LOCATION THEREOF AND STORAGE MEDIUM

(71) Applicant: BEIJING UNIVERSITY OF POSTS AND TELECOMMUNICATIONS, Beijing (CN)

(72) Inventors: Jianhua Zhang, Beijing (CN); Yujie Yang, Beijing (CN); Ping Zhang, Beijing (CN)

(73) Assignee: BEIJING UNIVERSITY OF POSTS AND TELECOMMUNICATIONS, Beijing (CN)

(*) Notice: Subject to any disclaimer, the term of this patent is extended or adjusted under 35 U.S.C. 154(b) by 0 days.

(21) Appl. No.: 16/583,154

(22) Filed: Sep. 25, 2019

(65) Prior Publication Data

US 2020/0120630 A1  Apr. 16, 2020

(30) Foreign Application Priority Data

Oct. 10, 2018 (CN) .......................... 2018 1 1176132

(51) Int. Cl.
*H04W 24/00* (2009.01)
*H04W 64/00* (2009.01)
(Continued)

(52) U.S. Cl.
CPC .......... *H04W 64/00* (2013.01); *H04W 16/18* (2013.01); *H04W 24/02* (2013.01); *H04W 24/08* (2013.01); *H04W 88/08* (2013.01)

(58) Field of Classification Search
CPC .............. B64C 39/024; B64C 2201/12; B64C 2201/141; B64C 2201/027;
(Continued)

(56) References Cited

U.S. PATENT DOCUMENTS

2009/0103484 A1* 4/2009 Shu ........................ H04W 16/28
370/329
2017/0069214 A1* 3/2017 Dupray ................ G08G 5/0021
(Continued)

FOREIGN PATENT DOCUMENTS

WO  WO2020117930 A1 * 6/2020 ............ H04W 24/02

*Primary Examiner* — Khalid W Shaheed
(74) *Attorney, Agent, or Firm* — J.C. Patents

(57) ABSTRACT

The present disclosure provides a method, an apparatus, and a storage medium for determining a location of an intelligent base station. The method includes: acquiring environment information of an environment in which the intelligent base station is located, and identifying texture information and location information of each scatterer in the environment in which the intelligent base station is located according to the environment information; performing a three-dimensional reconstruction on the environment in which the intelligent base station is located according to the texture information and the location information, to obtain a three-dimensional simulated environment; determining communication quality parameters in the three-dimensional simulated environment, and determining a location with a best communication quality according to the communication quality parameters, and determining the location with the best communication quality as the location of the intelligent base station, and the communication quality parameters includes a channel interference value or a system throughput.

6 Claims, 7 Drawing Sheets

(51) Int. Cl.
*H04W 16/18* (2009.01)
*H04W 24/02* (2009.01)
*H04W 24/08* (2009.01)
*H04W 88/08* (2009.01)

(58) Field of Classification Search
CPC ....... B64C 2201/024; B64C 2201/122; H04W 72/042; H04W 72/04
See application file for complete search history.

(56) References Cited

U.S. PATENT DOCUMENTS

| | | | |
|---|---|---|---|
| 2017/0083645 A1* | 3/2017 | Miyakawa | B64C 39/024 |
| 2017/0126309 A1* | 5/2017 | Rupasinghe | H04B 7/18506 |
| 2018/0248613 A1* | 8/2018 | Peitzer | H04B 7/18506 |
| 2019/0342763 A1* | 11/2019 | Jung | H04B 17/3913 |

* cited by examiner

INTELLIGENT BASE STATION WITH CAPABILITY TO IDENTIFY THREE-DIMENSIONAL ENVIRONMENT, METHOD FOR DETERMINING LOCATION THEREOF AND STORAGE MEDIUM

CROSS-REFERENCE TO RELATED APPLICATIONS

This application claims priority to Chinese Patent Application No. 201811176132.4, filed on Oct. 10, 2018, which is incorporated herein by reference in its entirety.

TECHNICAL FIELD

The present disclosure relates to the field of communications, and in particular, to a method, an apparatus, and a storage medium for determining a location of an intelligent base station.

BACKGROUND

With the development of science and technology, people are increasingly demanding the quality of mobile networks, making the placement of base stations more and more important.

In the prior art, when selecting a location of a base station, the base station is usually placed artificially according to the needs of the user. In addition, a small outdoor base station can also be placed by means of unmanned aerial vehicle (UAV) distribution. However, for a small indoor base station, especially in an official building or in a residential building, it cannot be automatic deployed by using the means of UAV distribution. When the environment in which the base station is located changes, the location of the base station cannot be adjusted, resulting in unreasonable application of resources. Moreover, due to that the coverage of the mobile network is limited, the terminal device, in the area out of coverage area or with poor coverage, cannot be used normally, resulting in lower user experience. Therefore, how to select the placement location of the base station to achieve optimal communication performance is a technical problem urgent to be solved currently.

SUMMARY

To solve the problems in the prior art, the present disclosure provides a method, an apparatus, and a storage medium for determining a location of an intelligent base station, which enable to select an optimal placement location for the intelligent base station, thereby achieving optimal communication performance.

According to a first aspect of the embodiment of the present disclosure, a method for determining a location of an intelligent base station is provided, and the method includes:

acquiring environment information of an environment in which the intelligent base station is located, and identifying texture information and location information of each scatterer in the environment in which the intelligent base station is located according to the environment information;

performing a three-dimensional reconstruction on the environment in which the intelligent base station is located according to the texture information and the location information, to obtain a three-dimensional simulated environment; and determining communication quality parameters in the three-dimensional simulated environment, and determining a location with a best communication quality according to the communication quality parameters, and determining the location with the best communication quality as the location of the intelligent base station, and the communication quality parameters includes a channel interference value or a system throughput.

Optionally, the determining a location with the best communication quality according to the communication quality parameters, includes:

determining a location with a smallest channel interference value or a location with a largest system throughput; and determining the location with the smallest channel interference value or the location with the largest system throughput as the location with the best communication quality.

Optionally, the determining the location with the smallest channel interference value, includes:

Step A: calculating a channel interference value of a first location and a channel interference value of a second location in the three-dimensional simulated environment, respectively;

Step B: comparing the channel interference value of the first location with the channel interference value of the second location, and determining the location with a smaller channel interference value as a new first location;

Step C: calculating a channel interference value of a third location in the three-dimensional simulated environment, and determining the third location as a new second location; the third location is a location different from the first location and the second location in the three-dimensional simulated environment; and Step D: repeating Step B-Step C until the channel interference values of all locations in the three-dimensional simulated environment are calculated to determine a location with the smallest channel interference value in the three-dimensional simulated environment.

Optionally, the determining a location with the smallest channel interference value, includes:

Step A: dividing a first area corresponding to the three-dimensional simulated environment into a plurality of second areas, and determining a center location of each second area;

Step B: calculating the channel interference value at the center location of each second area;

Step C: determining a second area with a smallest channel interference value, taking the second area with the smallest channel interference value as the new first area, and repeating Steps A-C, until the difference between the channel interference values calculated by two adjacent times is less than a preset value; and Step D: determining the center location corresponding to the channel interference value calculated last time as the location with the channel minimum interference value in the three-dimensional simulated environment.

Optionally, the determining a location with the largest system throughput, includes:

Step E: calculating system throughput of a fourth location and system throughput of a fifth location in the three-dimensional simulated environment, respectively;

Step F: comparing the system throughput of the fourth location with the system throughput of the fifth location, and determining the location with larger system throughput as the new fourth location;

Step G: calculating a system throughput of a sixth location in the three-dimensional simulated environment, and determining the sixth location as a new fifth location; the sixth location is a location different from the fourth location and the fifth location in the three-dimensional simulated environment; and Step H: repeating Step F-Step G until the system throughputs of all locations in the three-dimensional simulated environment are calculated to determine a location with the largest system throughput in the three-dimensional simulated environment.

Optionally, the determining a location with the largest system throughput, includes:

Step E: dividing a fourth area corresponding to the three-dimensional simulated environment into a plurality of fifth areas, and determining a central location of each fifth area;

Step F: calculating the system throughput at the center location of each fifth area;

Step G: determining a fifth area with the largest system throughput, and taking the fifth area with the largest system throughput as the new fourth area, and repeating Step E-Step G until the difference between the system throughputs calculated by two adjacent times is less than a preset value; and Step H: determining a center location corresponding to a system throughput calculated last time as the location with the largest system throughput in the three-dimensional simulated environment.

Optionally, the method further includes:

determining, according to texture information and location information of each scatterer, characteristics of wireless signals in an environment in which the intelligent base station is located; and updating, according to the characteristics of the wireless signals, the channel interference value of each location in the three-dimensional simulated environment.

Optionally, the calculating a channel interference value, includes:

receiving a wireless signal over a wireless channel;

extracting characteristic information of the wireless signal, and the characteristic information of the wireless signal includes the frequency and power of the signal;

determining characteristic information of the wireless channel according to the characteristic information of the wireless signal, where the characteristic information of the wireless channel includes a frequency point and a bandwidth of the channel; and calculating the channel interference value according to the characteristic information of the wireless channel.

According to a second aspect of the embodiment of the present disclosure, an apparatus for determining a location of an intelligent base station is provided, and the apparatus includes:

an acquiring module, configured to acquire environment information of an environment in which the intelligent base station is located;

an identifying module, configured to identify texture information and location information of each scatterer in the environment in which the intelligent base station is located according to the environment information;

a three-dimensional reconstruction module, configured to perform a three-dimensional reconstruction on the environment in which the intelligent base station is located according to the texture information and the location information, to obtain a three-dimensional simulated environment; and a determining module, configured to determine communication quality parameters in the three-dimensional simulated environment, determine a location with a best communication quality according to the communication quality parameters, and determine the location with the best communication quality as the location of the intelligent base station, and the communication quality parameters includes a channel interference value or a system throughput.

Optionally, the determining module is specifically configured to:

determine a location with a smallest channel interference value or a location with a largest system throughput; and determine the location with the smallest channel interference value or the location with the largest system throughput as the location with the best communication quality.

Optionally, the determining module is specifically configured to:

Step A: calculate a channel interference value of a first location and a channel interference value of a second location in the three-dimensional simulated environment, respectively;

Step B: compare the channel interference value of the first location with the channel interference value of the second location, and determine the location with a smaller channel interference value as a new first location;

Step C: calculate a channel interference value of a third location in the three-dimensional simulated environment, and determine the third location as a new second location; the third location is a location different from the first location and the second location in the three-dimensional simulated environment; and Step D: repeat Step B-Step C until the channel interference values of all locations in the three-dimensional simulated environment are calculated to determine a location with the smallest channel interference value in the three-dimensional simulated environment.

Optionally, the determining module is specifically configured to:

Step A: divide a first area corresponding to the three-dimensional simulated environment into a plurality of second areas, and determine a center location of each second area;

Step B: calculate the channel interference value at the center location of each second area;

Step C: determine a second area with a smallest channel interference value, take the second area with the smallest channel interference value as the new first area, and repeat Steps A-C, until the difference between the channel interference values calculated by two adjacent times is less than a preset value; and Step D: determine the center location corresponding to the channel interference value calculated last time as the location with the channel minimum interference value in the three-dimensional simulated environment.

Optionally, the determining module is specifically configured to:

Step E: calculate system throughput of a fourth location and system throughput of a fifth location in the three-dimensional simulated environment, respectively;

Step F: compare the system throughput of the fourth location with the system throughput of the fifth location, and determine the location with larger system throughput as the new fourth location;

Step G: calculate a system throughput of a sixth location in the three-dimensional simulated environment, and determine the sixth location as a new fifth location; the sixth location is a location different from the fourth location and the fifth location in the three-dimensional simulated environment; and Step H: repeat Step F-Step G until the system throughputs of all locations in the three-dimensional simulated environment are calculated to determine a location with the largest system throughput in the three-dimensional simulated environment.

Optionally, the determining module is specifically used to:

Step E: divide a fourth area corresponding to the three-dimensional simulated environment into a plurality of fifth areas, and determining a central location of each fifth area;

Step F: calculate the system throughput at the center location of each fifth area;

Step G: determine a fifth area with the largest system throughput, and take the fifth area with the largest system throughput as the new fourth area, and repeat Step E-Step G until the difference between the system throughputs calculated by two adjacent times is less than a preset value; and Step H: determine a center location corresponding to a system throughput calculated last time as the location with the largest system throughput in the three-dimensional simulated environment.

Optionally, the apparatus further includes an updating module; where:

the determining module is further configured to determine, according to texture information and location information of each scatterer, characteristics of wireless signals in an environment in which the intelligent base station is located; and the updating module, is configured to update, according to the characteristics of the wireless signals, the channel interference value of each location in the three-dimensional simulated environment.

Optionally, the determining module is specifically configured to:

receive a wireless signal over a wireless channel;

extract characteristic information of the wireless signal, and the characteristic information of the wireless signal includes the frequency and power of the signal;

determine characteristic information of the wireless channel according to the characteristic information of the wireless signal, where the characteristic information of the wireless channel includes a frequency point and a bandwidth of the channel; and calculate the channel interference value according to the characteristic information of the wireless channel.

According to a third aspect of the embodiments of the present disclosure, an intelligent base station is provided, including:

a processor;

a memory; and a computer program;

where, the computer program is stored in the memory and is configured to be executed by the processor, the computer program includes instructions for performing the method according to the first aspect.

According to a fourth aspect of the embodiment of the present disclosure, a computer readable storage medium is provided, the computer readable storage medium stores a computer program causing an intelligent base station to perform the method according to the first aspect.

The method, the apparatus and the storage medium for determining the location of the intelligent base station provided by the present disclosure, acquires environment information of an environment in which the intelligent base station is located, identifies, according to the environment information, texture information and location information of each scatterer in the environment in which the intelligent base station is located; performs a three-dimensional reconstruction on the environment in which the intelligent base station is located according to the texture information and the location information, to obtain a three-dimensional simulated environment; determines communication quality parameters in the three-dimensional simulated environment, determines a location with the best communication quality according to the communication quality parameters, and determines the location with the best communication quality as the location of the intelligent base station, where the communication quality parameters include a channel interference value or a system throughput. Since the texture information and the location information of each scatterer in the environment in which the intelligent base station is located are identified, and according to the above information, the intelligent base station performs a three-dimensional reconstruction on the environment, and the location with the best communication quality (i.e., the location with the smallest channel interference value or the largest system throughput) in the three-dimensional simulated environment can be determined according to the communication quality parameters in the three-dimensional simulated environment. When the intelligent base station is in the location with the best communication quality, the mobile network quality of the area covered by the intelligent base station is the best. Thus the location with the best communication quality can be determined as the optimal placement location of the intelligent base station, so as to achieve optimal communication performance.

BRIEF DESCRIPTION OF THE DRAWINGS

In order to more clearly illustrate the technical solutions in embodiments of the present disclosure or in the prior art, the drawings used in the embodiments or the description of the prior art will be briefly described below. Obviously, the drawings in the following description are only some embodiments of the present disclosure, and other drawings can be obtained from these drawings by those skilled in the art without any creative effort.

DETAILED DESCRIPTION OF THE EMBODIMENTS

The technical solutions in the embodiments of the present disclosure are clearly and completely described in the following with reference to the accompanying drawings in the embodiments of the present disclosure. It is obvious that the described embodiments are only a part of the embodiments of the present disclosure, and not all of the embodiments. All other embodiments obtained by those skilled in the art based on the embodiments of the present disclosure without creative efforts are within the scope of the present disclosure.

The method for determining the location of the intelligent base station provided by the embodiment of the present disclosure may be applicable to how to determine the placement location of the intelligent base station in an indoor or outdoor environment. In the prior art, when selecting a location of the base station, the base station is usually placed artificially according to the needs of the user. A small outdoor base station can also be placed by means of UAV distribution. However, A small indoor base station, cannot be automatically deployed by means of UAV distribution. Therefore, how to quickly determine an optimal placement location of the intelligent base station is a technical problem urgent as solved currently.

Considering the above problem, the present disclosure provides a method, by acquiring environment information of an environment in which the intelligent base station is located; identifying texture information and location information of each scatterer in the environment in which the intelligent base station is located according to the environment information; performing a three-dimensional reconstruction on the environment in which the intelligent base station is located according to the texture information and the location information, to obtain a three-dimensional simulated environment; determining communication quality parameters in the three-dimensional simulated environment, and determining a location with a best communication quality as the location of the intelligent base station, achieves that when the intelligent base station is in the location with the best communication quality (i.e., the location with the smallest channel interference value or the largest system throughput) in the three-dimensional simulated environment, the mobile network quality of the area covered by the intelligent base station is the best, such that the location with the best communication quality may be determined as the optimal placement of the intelligent base station, thereby achieving the optimal communication performance.

Figure 1:
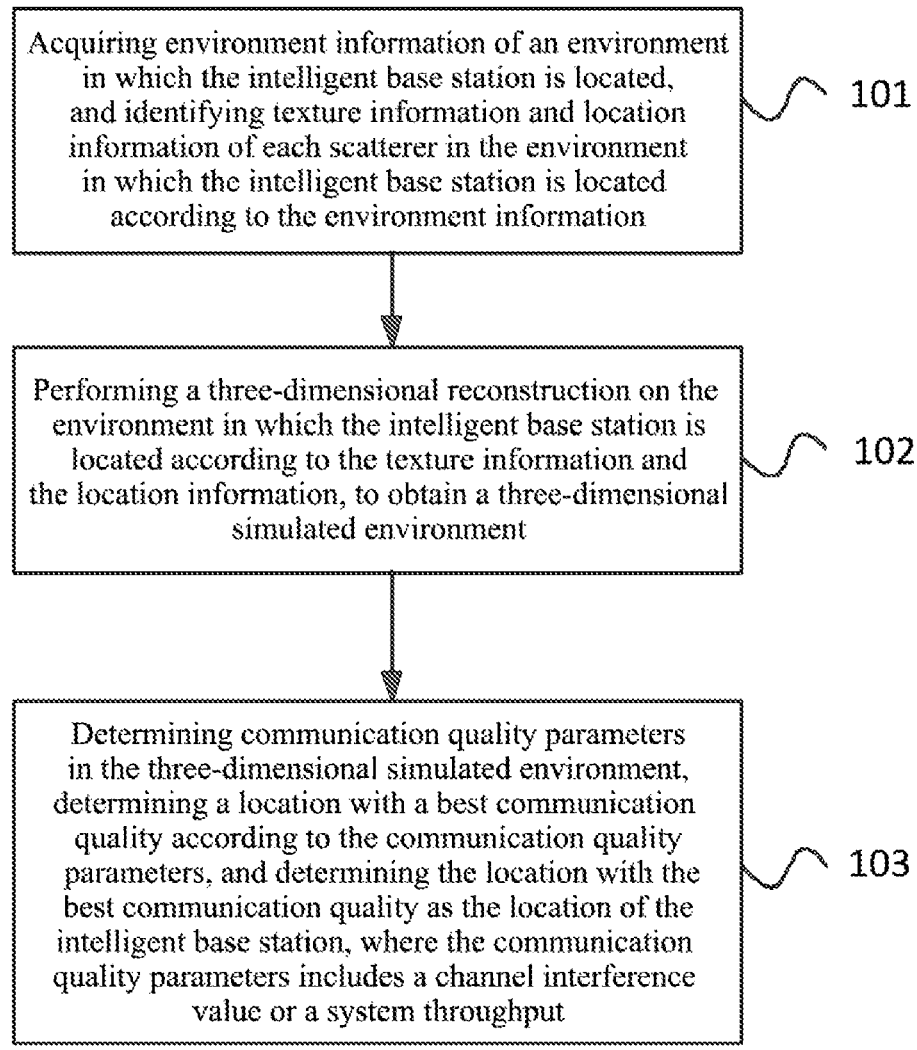
FIG. 1 illustrates a flowchart of a method for determining a location of an intelligent base station according to an exemplary embodiment of the present disclosure.

FIG. 1 illustrates a flowchart of a method for determining a location of an intelligent base station according to an exemplary embodiment of the present disclosure. As shown in FIG. 1, the method in this embodiment may include:

Step 101: acquiring environment information of an environment in which the intelligent base station is located, and identifying texture information and location information of each scatterer in the environment in which the intelligent base station is located according to the environment information.

In this step, the intelligent base station may acquire the environment information of the environment in which it is located by a plurality of means. In a possible implementation, the intelligent base station may acquire the environment information of the environment in which the intelligent base station is located by using a camera and various sensors mounted on the intelligent base station, for example, by using a depth camera, a binocular camera, a monocular camera, or a sensor such as a lidar. In another possible implementation, the environment information may also be collected by a UAV or a radar, and then is sent to the intelligent base station.

In addition, the environment information may include at least one of the following: indoor or outdoor environmental map information, scene information, and main scatterers in the environment, and the scatterers may include a building, a wall, a furniture, a human body, a motor vehicle and the like.

In this step, the environment information further includes texture information and location information of each scatterer in the environment where the intelligent base station is located; the scatterer in the environment where the intelligent base station is located may be an object that affects the propagation of the wireless signal on the channel, and the specific algorithm for identifying texture in the environment may be modeling based on an apparent material of the object or may be a semantic segmentation algorithm and the like based on a full convolutional neural network. A size and material information of the scatterer may be obtained by identifying the texture. For location identification of the scatterer, it mainly uses the location algorithm to calculate the location of the scatterer, where the location algorithm uses infrared indoor location technology, ultrasonic indoor location technology, bluetooth location technology, radio frequency identification technology, ultra-wideband technology, Wi-Fi technology, ZigBee technology, and etc. When the intelligent base station is in an indoor scenario, for the location identification of the scatterer in the environment in which the intelligent base station is located, a different location algorithm other than the above is adopted, and may specifically include a range-free method and a range-based method. Where the range-free method includes: a centroid algorithm and an approximate point-in-triangulation test (APIT) algorithm, and the range-based method is a method for estimating a node location according to a point-to-point distance between nodes or angle information by using a trilateration method, a triangulation method or a largest likelihood estimation method, and the range-based method includes: location algorithms such as time of arrival (TOA), time difference of arrival (TDOA), angle of arrival (AOA) and the like.

Step 102: performing a three-dimensional reconstruction on the environment in which the intelligent base station is located according to the texture information and the location information, to obtain a three-dimensional simulated environment.

In this step, when the intelligent base station performs three-dimensional reconstruction on the environment in which the intelligent base station is located according to the texture information and the location information, it may be performed through simultaneous localization and mapping (SLAM) algorithm or structure from motion (SFM) algorithm. Of course, the three-dimensional reconstruction may be performed by other algorithms, as long as the three-dimensional simulated environment is able as reconstructed according to the environment information. The specific method for reconstructing the three-dimensional simulated environment will not be limited herein by the embodiments of the present disclosure.

Step 103: determining communication quality parameters in the three-dimensional simulated environment, and determining a location with the best communication quality according to the communication quality parameters, and determining the location with a best communication quality as the location of the intelligent base station, where the communication quality parameters includes a channel interference value or a system throughput.

In this step, the communication quality parameters include a channel interference value or a system throughput, and the channel interference value refers to a magnitude of interference of the signal in the wireless channel. Generally, the value may be obtained according to the signal to interference and noise ratio. The system throughput is representative of a capacity in the communication system, the larger the capacity value, the better the communication performance. The quality of the communication may be affected by other factors, which will not be considered here in the present disclosure.

In this step, the determining a location with the best communication quality according to the communication quality parameters, includes: determining a location with the smallest channel interference value or a location with the largest system throughput; determining the location with the smallest channel interference value or the location with the largest system throughput as the location with the best communication quality. Specifically, the communication quality parameters at different locations in the three-dimensional simulated environment may be determined by the following formula. Specifically, the channel interference value at different locations in the three-dimensional simulated environment may be determined by the formula (1), and then the system throughput at different locations in the three-dimensional simulated environment may be determined by the formulas (2) and (3), so that the location with the best communication quality may be determined.

$$SINR_m = \frac{P_{m,m}|h_{m,m}^H w_m|^2}{\sum_{k \neq m} P_{m,k}|h_{m,k}^H w_m|^2 + \sigma^2} \quad (1)$$

Where, $SINR_m$ is the signal to interface and noise ratio at the user m in the communication system; $P_{m,m}$ is the receiving power from the intelligent base station m received by the user m in the communication system; $h_{m,m}$ is the channel between the user m and the intelligent base station m in the cell in the communication system; $h_{m,m}^H$ is the transposition of $h_{m,m}$; $P_{m,k}$ is the receiving power from the intelligent base station k received by the user m in the communication system; $h_{m,k}$ is the channel between the user m and the intelligent base station k in the cell in the communication system; $h_{m,k}^H$ is the transposition of $h_{m,k}$; $w_m$ is the beam forming vector at the intelligent base station m; $\sigma^2$ is the noise in the system.

$$R_m = E[\log_2(1 + SINR_m)] \quad (2)$$

$$S = \sum_{m=1}^{M} R_m \quad (3)$$

Where, $R_m$ is the capacity of each cell in the communication system, E is the expectation operation, $SINR_m$ is the signal to interface and noise ratio at the user m; S is the system throughput, and M is the largest number of users in the cell.

After calculating the communication quality parameters at different locations in the three-dimensional simulated environment, the location with the smallest channel interference value or the largest system throughput can be determined, because when the intelligent base station is in the location with the smallest channel interference or the largest system throughput, the mobile network quality in the area covered by the intelligence base station is the best. Therefore, the location with the smallest channel interference value or the location with the largest system throughput may be determined as the optimal placement location of the intelligent base station.

In this embodiment, by acquiring environment information of an environment in which the intelligent base station is located, identifying texture information and location information of each scatterer in the environment in which the intelligent base station is located according to the environment information, performing a three-dimensional reconstruction on the environment in which the intelligent base station is located according to the texture information and the location information, to obtain a three-dimensional simulated environment, determining communication quality parameters in the three-dimensional simulated environment, and determining a location with the best communication quality including a location with the smallest channel interference value or a location with the largest system throughput according to the communication quality parameters, the location with the best communication quality is determined as the location of the intelligent base station. When the intelligent base station is at the location with the smallest channel interference value or the location with the largest system throughput, the mobile network quality of the area covered by the intelligent base station is the best, so that the location with the smallest channel interference value or the location with the largest system throughput may be determined as the optimal placement location of the intelligent base station, so that the optimal communication performance can be achieved, thereby achieving selecting an optimal location for the intelligent base station, further realizing an automatic calculation and intelligent configuration of resources.

Figure 2:
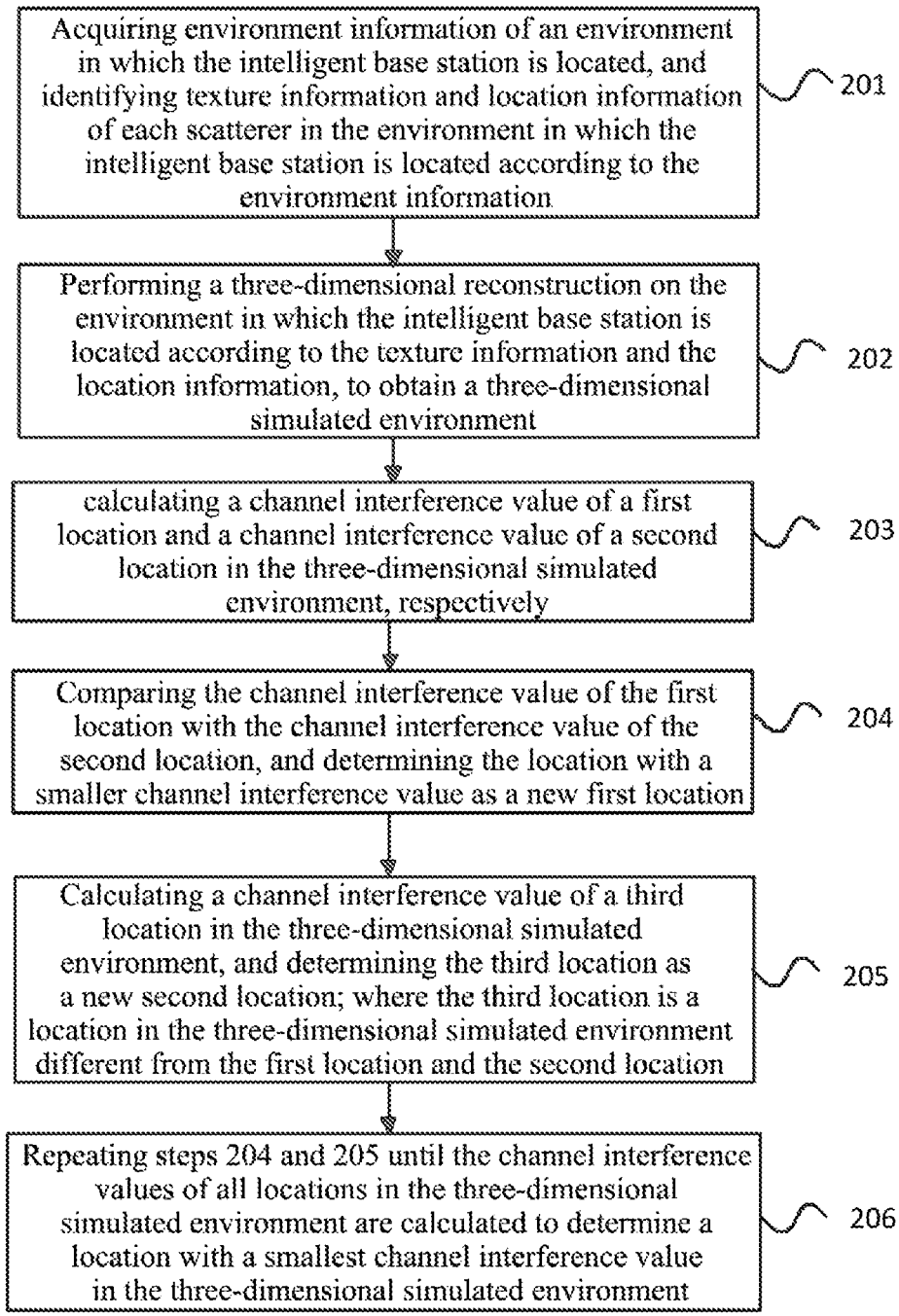
FIG. 2 illustrates a flowchart of a method for determining a location of an intelligent base station according to another exemplary embodiment of the present disclosure.

FIG. 2 illustrates a flowchart of a method for determining a location of an intelligent base station according to another exemplary embodiment of the present disclosure. On the basis of the embodiment shown in FIG. 1, this embodiment describes in detail on how to determine the location with the smallest channel interference value in the three-dimensional simulated environment. As shown in FIG. 2, and the method for determination includes the following steps:

Step 201: acquiring environment information of an environment in which the intelligent base station is located, and identifying texture information and location information of each scatterer in the environment in which the intelligent base station is located according to the environment information.

In this step, the environment information has been described in detail in step 101, and details are not described herein again.

Step 202: performing a three-dimensional reconstruction on the environment in which the intelligent base station is located according to the texture information and the location information, to obtain a three-dimensional simulated environment.

In this step, the manner of three-dimensional reconstruction is similar to that in step 102, and details are not described herein again.

Step 203: calculating a channel interference value of a first location and a channel interference value of a second location in the three-dimensional simulated environment, respectively.

In this step, the first location is an initial location of the intelligent base station in the three-dimensional simulated environment, and the second location is a location after the intelligent base station moves a preset distance after that the channel interference value of the first location is calculated.

The first location is different from the second location, and the preset distance may be set according to experience or an actual condition, for example, it may be 5 m, or 10 m. The present disclosure does not give any limitation on the specific value of the preset distance.

In a specific implementation process, the intelligent base station may calculate the channel interference value of the first location and the channel interference value of the second location in the three-dimensional simulated environment by: receiving a wireless signal over a wireless channel; and extracting characteristic information of the wireless signal which includes a frequency and a power of the signal; then determining characteristic information of the wireless channel according to the characteristic information of the wireless signal which includes a frequency point and a bandwidth of the channel; finally, calculating the channel interference value according to the characteristic information of the wireless channel.

Specifically, the intelligent base station receives the wireless signal over the wireless channel, and extracts the characteristic information of the wireless signal. It may specifically use an algorithm such as an unsupervised principal component analysis (PCA) algorithm or a supervised linear discriminant analysis (Linear Discriminant Analysis, LDA) algorithm to analyze the wireless signal to obtain characteristic information of the wireless signal, where the characteristic information of the wireless signal includes a frequency, a power and an angle of arrival of the signal.

After the characteristic information of the wireless signal is extracted, the characteristic information of the wireless channel can be obtained precisely according to the characteristic information of the wireless signal, where the characteristic information of the wireless channel includes the frequency point and bandwidth of the channel.

According to the characteristic information of the wireless channel, the wireless channel fading simulation is performed by using the electromagnetic field and the channel prediction method, and the channel interference calculation is performed according to the obtained stimulated parameters by simulating the wireless channel fading, where the electromagnetic field and the channel prediction method includes an electromagnetic calculation (e.g., raytracing) method, a machine learning algorithm, a data mining method and the like.

Since the scatterers in the environment have a certain influence on the channel interference value, in order to improve the accuracy of the channel interference value, the texture information and the location information of each scatterer in the environment where the intelligent base station is located may also be identified. According to the texture information and the location information of each scatterer, the characteristics of the wireless signal in the environment in which the intelligent base station is located may be determined, and then the channel interference value of each location in the three-dimensional simulated environment may be updated according to the characteristics of the wireless signal.

Specifically, when there is a scatterer in the environment where the intelligent base station is located, the intelligent base station receives the wireless signal in the environment over the wireless channel, and extracts the characteristic information of the wireless signal, and analyzes the wireless signal according to the foregoing analysis method to determine the characteristic information of the wireless signal in the environment in which the intelligent base station is located and obtains precise characteristic information of the wireless channel according to the determined characteristic information of the wireless signal, and according to the characteristic information of the wireless channel, uses the electromagnetic field and the channel prediction method to perform fading simulation of the wireless channel, and according to the obtained simulation parameters, finally determines the channel interference value in the environment where the intelligent base station is located by performing the fading simulation of the wireless channel, thereby updating the channel interference value of each location in the three-dimensional simulated environment. For example, if the scatterer in the three-dimensional simulated environment is a table, when the material and the placement location of the table changes, the table will have different effect on the wireless signal in the propagation environment, and therefore the channel interference value calculated by the intelligent base station is different. When the texture and location of the scatterer in the environment change, the intelligent base station will receive a new wireless signal to update the channel interference value of each location in the three-dimensional simulated environment, which not only makes the channel interference value more complete and accurate, but also the intelligent base station can determine the minimum interference value through the interference value updated in real-time, when the information in the three-dimensional simulated environment in which the in the intelligent base station is located changes, and thus the optimal placement location of the intelligent base station may be redeployed automatically, to achieve the purpose of optimizing the networking.

Step 204: comparing the channel interference value of the first location with the channel interference value of the second location, and determining the location with a smaller channel interference value as a new first location.

For example, it is assumed that the initial location of the intelligent base station in the three-dimensional simulated environment is A, that is, the first location is A, and the intelligent base station calculates that the channel interference value at the location A is a, and when the base intelligent station moves to the second location B, the intelligent base station calculates that the channel interference value at the location B is b, and assumes that the interference value a is smaller than the interference value b, at this time, the location corresponding to the interference value a is determined as the new first location A, and the interference value is denoted as a.

Step 205: calculating a channel interference value of a third location in the three-dimensional simulated environment, and determining the third location as a new second location; where the third location is a location in the three-dimensional simulated environment different from the first location and the second location.

For example, again, the intelligent base station moves in the three-dimensional simulated environment to a third location C different from the first location A and the second location B, and the intelligent base station calculates the interference value of the third location, and denotes the interference value of the third location as c, at the same time, the third location C is redefined as the new second location B, and its interference value is denoted as c.

Step 206: repeating steps 204 and 205 until the channel interference values of all locations in the three-dimensional simulated environment are calculated to determine a location with a smallest channel interference value in the three-dimensional simulated environment.

In this step, the channel interference value a of the new first location A of the intelligent base station in the three-dimensional simulated environment is compared with the channel interference value c of the new second location B of the intelligent base station in the three-dimensional simulated environment, assuming that the interference value a is greater than the interference value c, at this time, the location corresponding to the interference value c is denoted as the new first location A, and its interference value is denoted as c. The above steps are repeatedly performed according to a minimum interference iteration rule until the location corresponding to the minimum channel interference value of the three-dimensional simulated environment is calculated out, thereby determining the location corresponding to the minimum interference value, which is the optimal placement location of the intelligent base station. Among them, the minimum interference iteration rule is a method that utilizing the characteristic of a computer that is fast in operation and suitable for repetitive operation, the computer repeatedly performs interference calculation on two different locations in the three-dimensional simulated environment in which the intelligent base station is located, each time performing these steps, the location corresponding to the value with a smaller interference value is selected from the results of the previous calculation, and then is compared with another new location, and finally the minimum interference value is obtained in the three-dimensional simulated environment.

In this embodiment, according to the acquired environment information of an environment in which the intelligent base station is located, a three-dimensional simulated environment is obtained through three-dimensional reconstruction, and the intelligent base station calculates the interference value of different locations in the simulated environment, and uses the minimum interference iteration rule to determine the location with the minimum interference, and determines the characteristic information of the wireless signal in the environment in which the intelligent base station is located according to the texture information and the location information of each scatterer, and then updates the channel interference value of each location in the three-dimensional simulated environment, which not only makes the channel interference value more complete and accurate, but also makes the intelligent base station be able to determine the minimum interference value through the interference value updated in real-time when the information in the three-dimensional simulated environment in which the intelligent base station is located changes, and thus the optimal placement location of the intelligent base station may be automatically deployed, thereby achieving the purpose of optimizing the networking.

Figure 3:
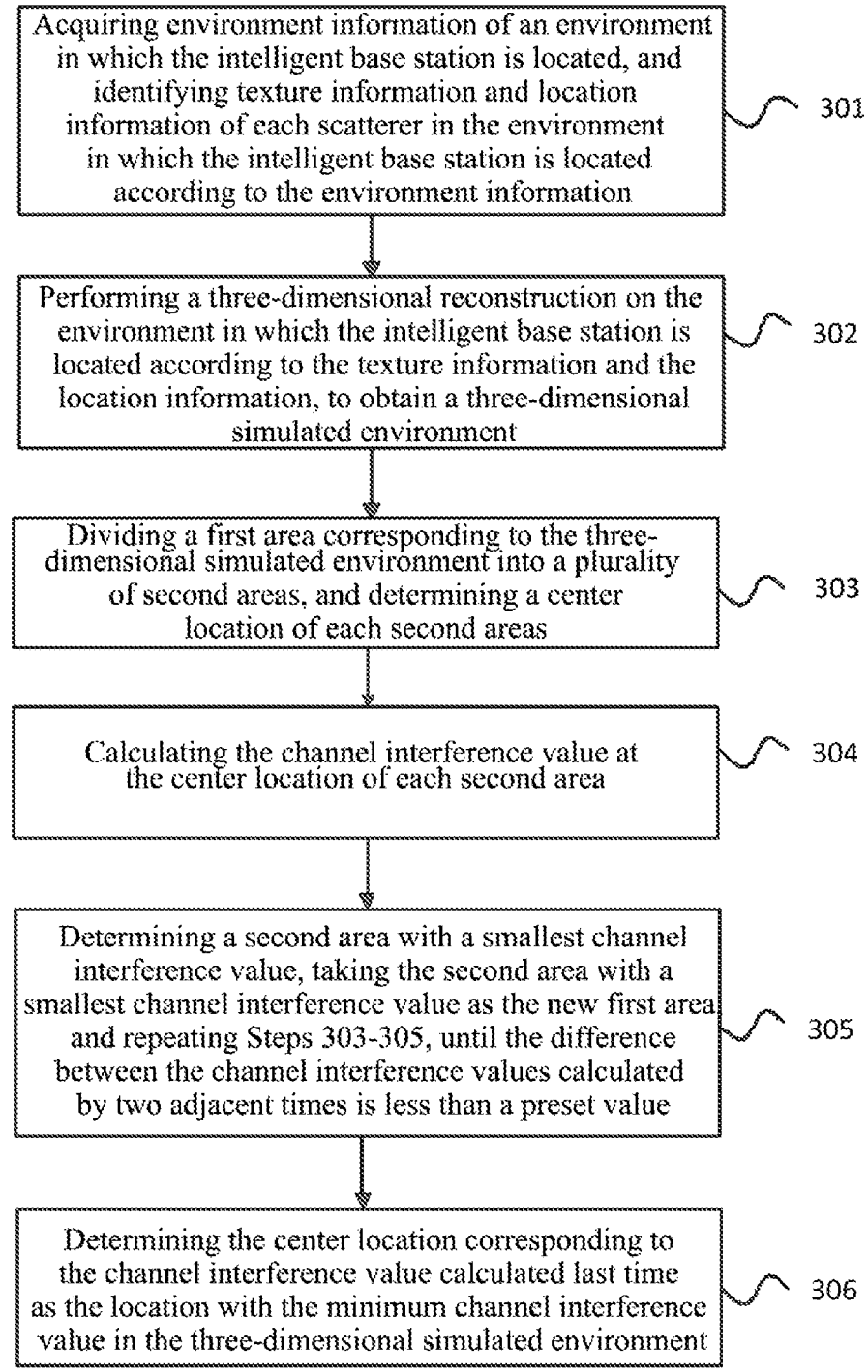
FIG. 3 illustrates a flowchart of a method for determining a location of an intelligent base station according to still another exemplary embodiment of the present disclosure.

FIG. 3 illustrates a flowchart of a method for determining a location of an intelligent base station according to another exemplary embodiment of the present disclosure. On the basis of the embodiment shown in FIG. 1, how to determine a location with the smallest channel interference value in a three-dimensional simulated environment is described in detail. As shown in FIG. 3, the method for determination includes the following steps:

Step 301: acquiring environment information of an environment in which the intelligent base station is located, and identifying texture information and location information of each scatterer in the environment in which the intelligent base station is located according to the environment information.

Step 301 is similar to step 101, and details are not described herein again.

Step 302: performing a three-dimensional reconstruction on the environment in which the intelligent base station is located according to the texture information and the location information, to obtain a three-dimensional simulated environment.

In this step, the manner of three-dimensional reconstruction is similar to that in step 102, and details are not described herein again.

Step 303: dividing a first area corresponding to the three-dimensional simulated environment into a plurality of second areas, and determining a center location of each second area.

In this step, the first area may be divided into a plurality of second areas by random division. In order to make the determined location of the intelligent base station more accurate, in a possible division manner, the first area may be divided according to an average division manner. The embodiments of the present disclosure do not limit the number of the areas divided and the division manner.

Step 304: calculating the channel interference value at the center location of each second area.

In this step, the channel interference value at the center location of each area represents the interference value at different locations in this second area. Specifically, for example, it is assumed that the first area corresponding to the three-dimensional simulated environment is divided into a plurality of second areas, and the center locations of each second area are respectively marked as A, B, C, D, E, F, . . . , and the intelligent base station calculates the channel interference values at locations A, B, C, D, E, F, . . . which are marked as a, b, c, d, e, f, . . . respectively, and the interference values a, b, c, d, e, f . . . also represents the channel interference value of other locations in the second area that are different from the center location.

Step 305: determining a second area with a smallest channel interference value, taking the second area with a smallest channel interference value as the new first area, and repeating Steps 303-305, until the difference between the channel interference values calculated by two adjacent times is less than a preset value.

Specifically, for example, assuming that the smallest of the interference values a, b, c, d, e, f, . . . is c, the center location corresponding to the minimum interference value is C, and take the second area where the location C is located as a new first area. The minimum interference iteration rule is used for the new first area where C is located, and steps 303-305 are repeatedly performed until the difference between the channel interferences calculated by two adjacent times is less than the preset value. The preset value may be set according to experience or actual situation. The embodiments of the present disclosure do not limit what the preset value is.

Step 306: determining the center location corresponding to the channel interference value calculated last time as the location with the minimum channel interference value in the three-dimensional simulated environment.

In this step, two center locations, the difference between the adjacent two channel interference values of which less than the preset value, are determined according to the minimum interference iteration rule, and the intelligent base station determines the center location corresponding to the channel interference value calculated last time as the location with the minimum channel interference value in the three-dimensional simulated environment, which is the optimal placement location of the intelligent base station.

In this embodiment, by acquiring the environment information of the environment in which the intelligent base station is located, and identifying the texture information and the location information of each scatterer in the environment in which the intelligent base station is located according to the environment information, a three-dimensional simulated environment is obtained through three-dimensional reconstruction. The intelligent base station calculates the interference value of the center location of each area in the simulation environment, and determines the location with the smallest interference value using the minimum interference iteration rule. And, the intelligent base station calculates the characteristic information of the wireless signal in the environment in which the intelligent base station is located, according to the texture information and location information of each scatterer, and then updates the channel interference value of each location in the three-dimensional simulated environment, which not only makes the channel interference value more complete and accurate, but also makes the intelligent base station be able to determine the minimum interference value through the interference value updated in real-time when the information in the three-dimensional simulated environment in which the in the intelligent base station is located changes, and thus the optimal placement location of the intelligent base station may be automatically deployed, thereby achieving the purpose of optimizing the networking.

Figure 4:
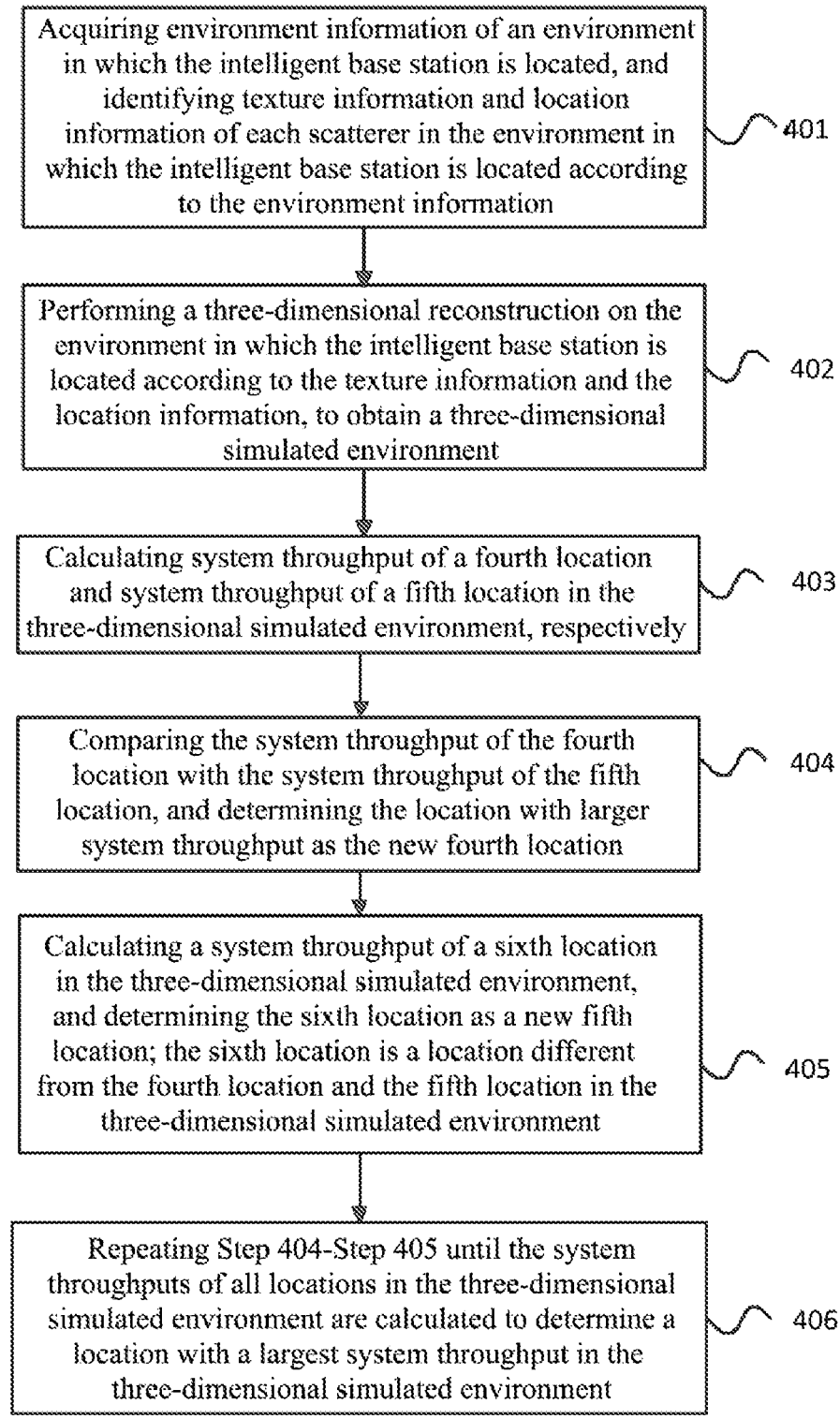
FIG. 4 illustrates a flowchart of a method for determining a location of an intelligent base station according to still another exemplary embodiment of the present disclosure.

FIG. 4 illustrating a flowchart of a method for determining a location of an intelligent base station according to still another exemplary embodiment of the present disclosure. On the basis of the embodiment shown in FIG. 1, how to determine a location with the largest system throughput in a three-dimensional simulated environment is described in detail. As shown in FIG. 4, the method for determination includes the following steps:

Step 401: acquiring environment information of an environment in which the intelligent base station is located, and identifying texture information and location information of each scatterer in the environment in which the intelligent base station is located according to the environment information.

In this step, the environment information has been described in detail in step 101, and details are not described herein again.

Step 402: performing a three-dimensional reconstruction on the environment in which the intelligent base station is located according to the texture information and the location information, to obtain a three-dimensional simulated environment.

In this step, the manner of three-dimensional reconstruction is similar to that in step 102, and details are not described herein again.

Step 403: calculating system throughput of a fourth location and system throughput of a fifth location in the three-dimensional simulated environment, respectively.

In this step, the system throughput of the fourth location and the system throughput of the fifth location in the three-dimensional simulated environment are calculated by calculating the system throughput at the fourth location and the system throughput at the fifth location in the three-dimensional simulated environment respectively by combining formula (1), formula (2) and formula (3). The method for calculating the system throughput is not limited in the present disclosure.

Step 404: comparing the system throughput of the fourth location with the system throughput of the fifth location, and determining the location with larger system throughput as the new fourth location.

In this step, it is assumed that the initial location of the intelligent base station in the three-dimensional simulated environment is E, that is, the fourth location is E, and the intelligent base station calculates that the system throughput at the E location is e. The base intelligent station moves to the fifth location F, and the intelligent base station calculates the system throughput at the F location as f. Assuming that the system throughput e is greater than the system throughput f, at this time, the location corresponding to the system throughput e is determined as the new fourth location E, and its system throughput is denoted as e.

Step 405: calculating a system throughput of a sixth location in the three-dimensional simulated environment, and determining the sixth location as a new fifth location; the sixth location is a location different from the fourth location and the fifth location in the three-dimensional simulated environment.

For example, the intelligent base station moves again in the three-dimensional simulated environment to a sixth location G different from the fourth location E and the fifth location F, and the intelligent base station calculates the system throughput of the sixth location, and denotes the system throughput of the sixth location as g, at the same time, the sixth location G is redefined as the new fifth location F, and the system throughput of the new fifth location F is denoted as g.

Step 406: repeating Step 404-Step 405 until the system throughputs of all locations in the three-dimensional simulated environment are calculated to determine a location with a largest system throughput in the three-dimensional simulated environment.

In this step, the system throughput e of the new fourth location E of the intelligent base station in the three-dimensional simulated environment is compared with the system throughput g of the new fifth location F of the intelligent base station in the three-dimensional simulated environment. Assuming the system throughput e is smaller than the system throughput g, at this time, the location corresponding to the system throughput g is denoted as the new fourth location E, and the system throughput of the new fourth location E is denoted as g, and the above steps are repeatedly performed until the location with the largest system throughput in the three-dimensional simulated environment is calculated out, thereby determining the location corresponding to the largest system throughput, which is the optimal placement location of the intelligent base station.

Figure 5:
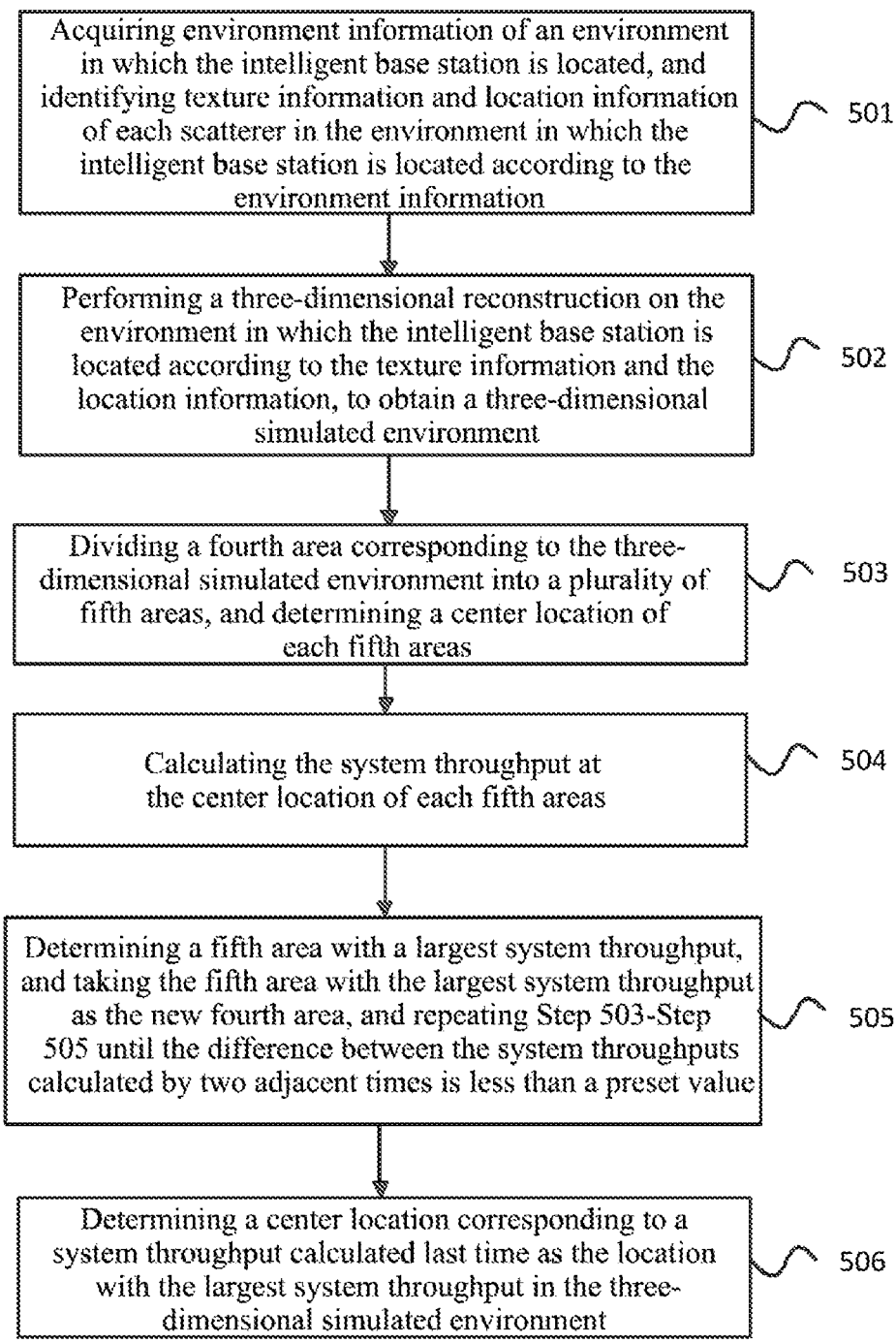
FIG. 5 illustrates a flowchart of a method for determining a location of an intelligent base station according to still another exemplary embodiment of the present disclosure.

FIG. 5 illustrates a flowchart of a method for determining a location of an intelligent base station according to still another exemplary embodiment of the present disclosure. On the basis of the embodiment shown in FIG. 1, the process of how to determine a location with the largest system throughput in a three-dimensional simulated environment is described in detail. As shown in FIG. 5, the method for determination includes the following steps:

Step 501: acquiring environment information of an environment in which the intelligent base station is located, and identifying texture information and location information of each scatterer in the environment in which the intelligent base station is located according to the environment information.

Step 501 is similar to step 101, and details are not described herein again.

Step 502: performing a three-dimensional reconstruction on the environment in which the intelligent base station is located according to the texture information and the location information, to obtain a three-dimensional simulated environment.

In this step, the manner of three-dimensional reconstruction is similar to that in step 102, and details are not described herein again.

Step 503: dividing a fourth area corresponding to the three-dimensional simulated environment into a plurality of fifth areas, and determining a center location of each fifth area.

In this step, the manner of area division is similar to that in step 303, and details are not described herein again.

Step 504: calculating the system throughput at the center location of each fifth area.

In this step, the system throughput at the center location of each fifth area is calculated mainly by calculating the system throughput at the center location of each fifth area is obtained by combining formula (1), formula (2), and formula (3), respectively. The system throughput at the center location of each fifth area represents the system throughput at different locations in this area. Specifically, for example, it is assumed that the fourth area corresponding to the three-dimensional simulated environment is divided into a plurality of fifth areas, and center locations of each fifth area are marked as A, B, C, D, E, F, . . . , and the intelligent base station calculates the system throughputs at locations A, B, C, D, E, F . . . and denoted as a, b, c, d, e, f . . . , the system throughput a, b, c, d, e, f . . . also represents the system throughput of other locations in their own area that are different from the center location.

Step 505: determining a fifth area with a largest system throughput, and taking the fifth area with a largest system throughput as the new fourth area, and repeating Step 503-Step 505 until difference between the system throughputs calculated by two adjacent times is less than a preset value.

Specifically, for example, assuming that the largest of the above system throughputs a, b, c, d, e, f, . . . is c, then the center location corresponding to the largest system throughput is C, and the fifth area where the location C is located is taken as a new fourth area, and then for the new fourth area where C is located, steps 503-505 are repeated until the difference between the system throughputs calculated by two adjacent times is less than the preset value, and the preset value may be set according to experience or the actual situation.

Step 506: determining a center location corresponding to a system throughput calculated out last time as the location with the largest system throughput in the three-dimensional simulated environment.

In this step, according to the determined two center locations that the difference between the two system throughputs adjacent being less than the preset value, the intelligent base station determines the center location corresponding to the system throughput last calculated as a location with the largest system throughput in the three-dimensional simulated environment, which is the optimal placement of the intelligent base station.

In the present disclosure, the location of the intelligent base station can be located by using the location method in step 101, and the frequency at the location of the intelligent base station can be calculated at the same time. When the three-dimensional simulated environment in which the intelligent base station is located changes, the intelligent base station can optimize the networking through the adaptive networking. The adaptive networking may include an adaptive adjustment mechanism of the protocol parameters, an adaptive multipath routing algorithm and etc. For example, it is assumed that the location of the intelligent base station is point A, and there are different scatterers in the environment. When the scatterers in the environment in a certain period of time has changed, assuming that only the number of people increases, and other conditions remain unchanged, the intelligent base station will recalculate the channel interference value or system throughput at different locations in the environment according to collected information such as an increment of users' demand or poor communication network. By calculation, it can be known that when the intelligent base station moves to point B, the interference value in the channel is the smallest or the system throughput is the largest, so the point B is determined as the best location for the intelligent base station. At this time, it can meet the users' demands and improve the users' experience.

In the present disclosure, after determining the optimal location of the intelligent base station according to the location with the best communication quality determined out, the intelligent base station does not change its location within a certain period of time, but, when the environment in which the intelligent base station is located changes, the communication quality of the environment in which the intelligent base station is located may change. In this case, it needs to improve the communication quality of the environment in which the intelligent base station is located by the manner of optimizing the networking. Of course, implementations of optimizing the networking may include reducing interference values for channels in the communication system and increasing system throughput. The interference value of the wireless channel in the communication system can be reduced by the method for determining the location of the intelligent base station and the formula (1) to achieve the intelligent base station placed at the optimal location, so that the interference value in the channel is smallest, and the purpose of optimizing networking is achieved; on the other hand, combined with formulas (2) and (3), an inter-cell overlap cooperation algorithm of downlink cooperative beamforming is used to eliminate interference between different intelligent base stations to achieve the purpose of improving system throughput.

Figure 6:
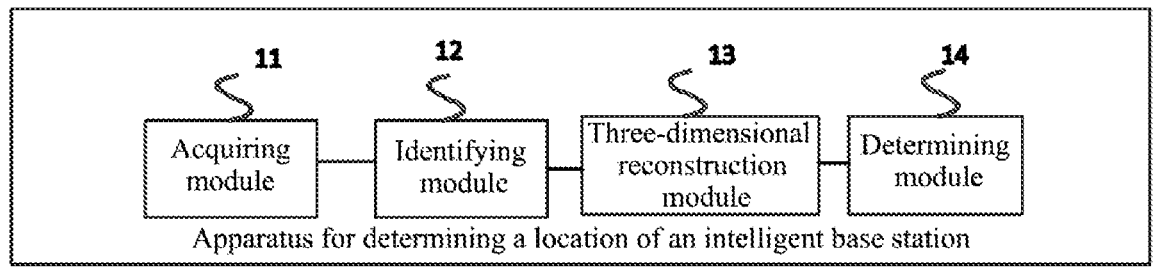
FIG. 6 is a block diagram of an apparatus for determining a location of an intelligent base station according to an exemplary embodiment.

FIG. 6 is a block diagram of an apparatus for determining a location of a base station according to an exemplary embodiment of the present disclosure. As shown in FIG. 6, the apparatus for determining a location of an intelligent base station may include: an acquiring module 11, an identifying module 12, and a three-dimensional reconstruction module 13 and a determining module 14.

The obtaining module 11 is configured to acquire environment information of an environment in which the intelligent base station is located.

The identifying module 12 is configured to identify texture information and location information of each scatterer in the environment in which the intelligent base station is located according to the environment information.

The three-dimensional reconstruction module 13 is configured to perform a three-dimensional reconstruction on the environment in which the intelligent base station is located according to the texture information and the location information, to obtain a three-dimensional simulated environment.

The determining module 14 is configured to determine communication quality parameters in the three-dimensional simulated environment, determine a location with the best communication quality according to the communication quality parameters, and determine the location with the best communication quality as the location of the intelligent base station, and the communication quality parameters includes a channel interference value or a system throughput.

According to the apparatus for determining a location of an intelligent base station provided in this embodiment, the acquiring module 11 acquires environment information of an environment in which the intelligent base station is located;

the identifying module 12 identifies texture information and location information of each scatterer in the environment in which the intelligent base station is located according to the environment information, the three-dimensional reconstruction module 13 performs a three-dimensional reconstruction on the environment in which the intelligent base station is located according to the texture information and the location information, to obtain a three-dimensional simulated environment; and the determining module 14 determines communication quality parameters in the three-dimensional simulated environment, determine a location with the best communication quality which may include the location with the smallest channel interference value or the location with the largest system throughput according to the communication quality parameters, and determines the location with the best communication quality as the location of the intelligent base station. The mobile network quality of the area covered by the intelligent base station is the best when the intelligent base station is at the location with the smallest channel interference value or the location with the largest system throughput. Therefore, the location with the channel interference value is the smallest or the location with the largest system throughput is determined as the optimal placement location of the intelligent base station, which not only realizes selecting the optimal location for the intelligent base station, but also further realizes the automatic calculation and intelligent configuration of resources.

Optionally, the determining module 14 is further configured to:

determine a location with the smallest channel interference value or a location with the largest system throughput;

determine the location with the smallest channel interference value or the location with the largest system throughput as the location with the best communication quality.

In a possible implementation manner, the determining module 14 of the intelligent base station is further configured to:

Step A: calculate a channel interference value of a first location and a channel interference value of a second location in the three-dimensional simulated environment, respectively;

Step B: compare the channel interference value of the first location with the channel interference value of the second location, and determine the location with a smaller channel interference value as a new first location;

Step C: calculate a channel interference value of a third location in the three-dimensional simulated environment, and determine the third location as a new second location; the third location is a location different from the first location and the second location in the three-dimensional simulated environment; and Step D: repeat Step B-Step C until the channel interference values of all locations in the three-dimensional simulated environment are calculated to determine a location with the smallest channel interference value in the three-dimensional simulated environment.

Optionally, the determining module 14 is specifically configured to:

Step A: divide a first area corresponding to the three-dimensional simulated environment into a plurality of second areas, and determine a center location of each second area;

Step B: calculate the channel interference value at the center location of each second area;

Step C: determine a second area with a smallest channel interference value, take the second area with the smallest channel interference value as the new first area, and repeat Steps A-C, until the difference between the channel interference values calculated by two adjacent times is less than a preset value; and Step D: determine the center location corresponding to the channel interference value calculated last time as the location with the channel minimum interference value in the three-dimensional simulated environment.

In another possible implementation manner, the determining module 14 of the intelligent base station is further configured to:

Step E: calculate system throughput of a fourth location and system throughput of a fifth location in the three-dimensional simulated environment, respectively;

Step F: compare the system throughput of the fourth location with the system throughput of the fifth location, and determine the location with larger system throughput as the new fourth location;

Step G: calculate a system throughput of a sixth location in the three-dimensional simulated environment, and determine the sixth location as a new fifth location; the sixth location is a location different from the fourth location and the fifth location in the three-dimensional simulated environment; and Step H: repeat Step F-Step G until the system throughputs of all locations in the three-dimensional simulated environment are calculated to determine a location with the largest system throughput in the three-dimensional simulated environment.

Optionally, the determining module 14 is further configured to:

Step E: divide a fourth area corresponding to the three-dimensional simulated environment into a plurality of fifth areas, and determining a central location of each fifth area;

Step F: calculate the system throughput at the center location of each fifth area;

Step G: determine a fifth area with the largest system throughput, and take the fifth area with the largest system throughput as the new fourth area, and repeat Step E-Step G until the difference between the system throughputs calculated by two adjacent times is less than a preset value; and Step H: determine a center location corresponding to a system throughput with the largest system throughput calculated last time as the location in the three-dimensional simulated environment.

With regard to the apparatus in the above embodiment, the specific manner in which the respective modules perform the operations has been described in detail in the embodiments relating to the methods, and will not be explained in detail herein.

Figure 7:
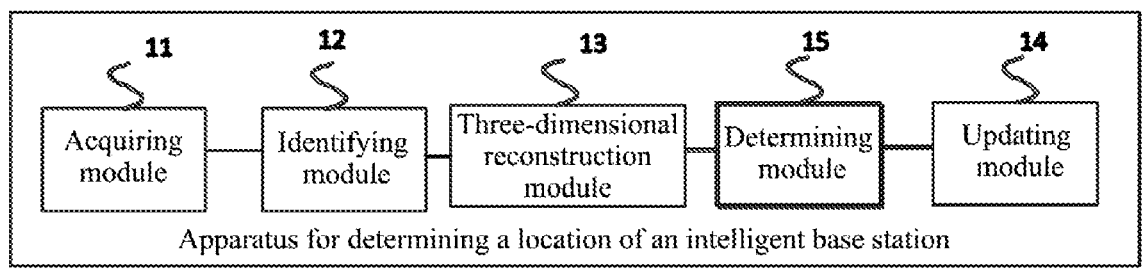
FIG. 7 is a block diagram of an apparatus for determining a location of an intelligent base station according to another exemplary embodiment.

FIG. 7 is a block diagram of an apparatus for determining a location of a base station according to another exemplary embodiment of the present disclosure. As shown in FIG. 7, the apparatus further includes an updating module 15.

The determining module 14 is further configured to determine, according to texture information and location information of each scatterer, characteristics of wireless signals in an environment in which the intelligent base station is located;

the updating module 15 is configured to update, according to the characteristics of the wireless signals, the channel interference value of each location in the three-dimensional simulated environment.

The apparatus for determining the location of the intelligent base station provided by this embodiment of the present disclosure may perform the foregoing method embodiments. The implementation principle and technical effects are similar, and details are not described herein again.

Optionally, the determining module 14 is specifically configured to:

receive a wireless signal over a wireless channel;

extract characteristic information of the wireless signal, and the characteristic information of the wireless signal includes a frequency and a power of the signal;

determine characteristic information of the wireless channel according to the characteristic information of the wireless signal, where the characteristic information of the wireless channel includes a frequency point and a bandwidth of the channel; and calculate the channel interference value according to the characteristic information of the wireless channel.

The apparatus for determining the location of the intelligent base station provided by this embodiment of the present disclosure may perform the foregoing method embodiments. The implementation principle and technical effects are similar, and details are not described herein again.

Figure 8:
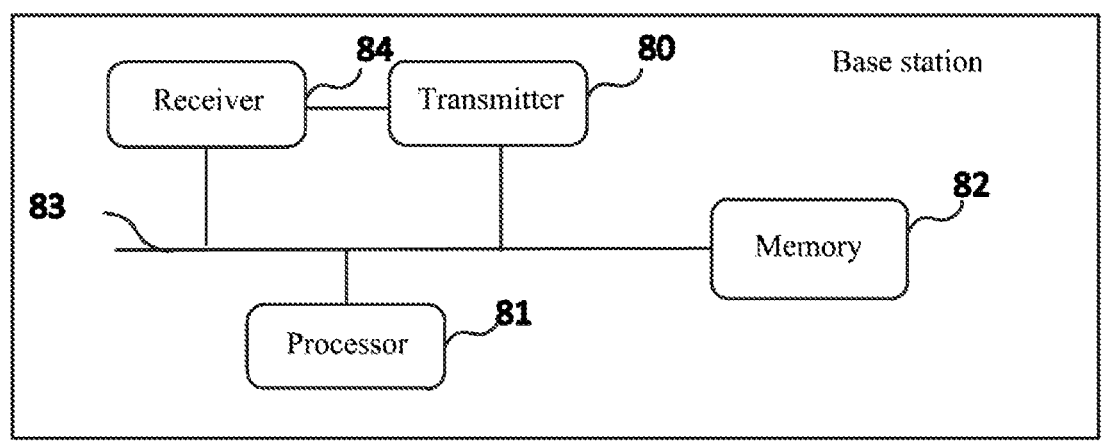
FIG. 8 is a schematic structural diagram of an intelligent base station according to an embodiment of the present disclosure.

FIG. 8 is a schematic structural diagram of an intelligent base station according to an embodiment of the present disclosure. FIG. 8 illustrates a block diagram of an exemplary intelligent base station suitable to be used for implementing embodiments of the present disclosure. The intelligent base station shown in FIG. 8 is merely an example and should not impose any limitation on the scope of function and usage of the embodiments of the present disclosure.

As shown in FIG. 8, the intelligent base station can include a transmitter 80, a processor 81, a memory 82, and at least one communication bus 83. The communication bus 83 is used to implement a communication connection between the components. The memory 82 may include high speed random access memory (RAM) memory, and may also include non-volatile memory (NVM), such as at least one disk memory. Various programs may be stored in the memory 82 for performing various processing functions and the method steps for implementing the present embodiments. In addition, the intelligent base station may further include a receiver 84. The receiver 84 in this embodiment may be a corresponding input interface having a communication function and a function for receiving information, and may also be a radio frequency module or a baseband module on the intelligent base station. The transmitter 80 in this embodiment may be a corresponding output interface having a communication function and a function for transmitting information, and may also be a radio frequency module or a baseband module on the intelligent base station. Optionally, the transmitter 80 and the receiver 84 may be integrated in one communication interface, or may be two independent communication interfaces.

Additionally, a computer program is stored in the memory 82 and is configured to be executed by the processor 81, the computer program includes instructions for performing the methods of the embodiments illustrated in FIGS. 1-5 above.

The embodiments of the present disclosure further provides a computer readable storage medium, where the computer readable storage medium stores a computer program, and the computer program causes the intelligent base station to perform the method for determining the location of the intelligent base station provided by the foregoing embodiments shown in FIGS. 1-5. Where, the above readable storage medium may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic or optical disk.

One of ordinary skill in the art will appreciate that all or part of the steps to implement the various method embodiments described above may be accomplished by hardware associated with program instructions. The aforementioned program may be stored in a computer readable storage medium. The program, when executed, performs the steps including the foregoing method embodiments; and the foregoing storage medium includes various media that can store program codes, such as a ROM, a RAM, a magnetic disk, or an optical disk.

It should be noted that the above embodiments are only used to explain the technical solution of the present disclosure and shall not be construed as limitation. Although the present disclosure has been described in detail with reference to the foregoing embodiments, those skilled in the art will understand that the technical solutions described in the foregoing embodiments may be modified, or some or all of the technical features may be equivalently substituted; and the modifications or substitutions do not deviate from the scope of the technical solutions of the embodiments of the present disclosure.

What is claimed is:

1. A method for determining a location of an intelligent base station with capability to identify three-dimensional environment, comprising:

acquiring environment information of an environment in which the intelligent base station is located, and identifying texture information and location information of each scatterer in the environment in which the intelligent base station is located according to the environment information;

performing a three-dimensional reconstruction on the environment in which the intelligent base station is located according to the texture information and the location information, to obtain a three-dimensional simulated environment;

determining communication quality parameters in the three-dimensional simulated environment, wherein the communication quality parameters comprise channel interference values or system throughputs; and determining a location with a smallest channel interference value according to the communication quality parameters, and determining the location with the smallest channel interference value as a location of the intelligent base station;

wherein the determining a location with a smallest channel interference value, comprises:

Step A: calculating a channel interference value of a first location and a channel interference value of a second location in the three-dimensional simulated environment, respectively;

Step B: comparing the channel interference value of the first location with the channel interference value of the second location, and determining the location with a smaller channel interference value as a new first location;

Step C: calculating a channel interference value of a third location in the three-dimensional simulated environment, and determining the third location as a new second location; the third location is a location different from the first location and the second location in the three-dimensional simulated environment; and Step D: repeating Step B to Step C until the channel interference values of all locations in the three-dimensional simulated environment are calculated to determine a location with the smallest channel interference value in the three-dimensional simulated environment.

2. The method according to claim 1, wherein the method further comprises:
  determining, according to texture information and location information of each scatterer, characteristics of wireless signals in an environment in which the intelligent base station is located; and
  updating, according to the characteristics of the wireless signals, the channel interference value of each location in the three-dimensional simulated environment.

3. The method according to claim 1, wherein the calculating a channel interference value, comprises:
  receiving a wireless signal over a wireless channel;
  extracting characteristic information of the wireless signal, and the characteristic information of the wireless signal comprises a frequency and a power of the signal;
  determining characteristic information of the wireless channel according to the characteristic information of the wireless signal, wherein the characteristic information of the wireless channel includes a frequency point and a bandwidth of the channel; and
  calculating the channel interference value according to the characteristic information of the wireless channel.

4. An intelligent base station with capability to identify three-dimensional environment, comprising:
  a processor;
  a memory;
  a computer program;
  wherein, the computer program is stored in the memory and is configured to be executed by the processor, the computer program comprises instructions for performing:
  acquiring environment information of an environment in which the intelligent base station is located, and identifying texture information and location information of each scatterer in the environment in which the intelligent base station is located according to the environment information;
  performing a three-dimensional reconstruction on the environment in which the intelligent base station is located according to the texture information and the location information, to obtain a three-dimensional simulated environment;
  determining communication quality parameters in the three-dimensional simulated environment, wherein the communication quality parameters comprise system throughputs; and
  determining a location with a location with a largest system throughput according to the communication quality parameters, and determining the location with the location with the largest system throughput as a location of the intelligent base station;
  wherein the determining a location with a location with a largest system throughput comprises at least one of:
  Step E: calculating system throughput of a fourth location and system throughput of a fifth location in the three-dimensional simulated environment, respectively;
  Step F: comparing the system throughput of the fourth location with the system throughput of the fifth location, and determining the location with larger system throughput as a new fourth location;
  Step G: calculating a system throughput of a sixth location in the three-dimensional simulated environment, and determining the sixth location as a new fifth location; the sixth location is a location different from the fourth location and the fifth location in the three-dimensional simulated environment; and Step H: repeating Step F-Step G until the system throughputs of all locations in the three-dimensional simulated environment are calculated to determine a location with the largest system throughput in the three-dimensional simulated environment; or,
  Step E: dividing a fourth area corresponding to the three-dimensional simulated environment into a plurality of fifth areas, and determining a central location of each fifth area;
  Step F: calculating the system throughput at the center location of each fifth area;
  Step G: determining a fifth area with the largest system throughput, and taking the fifth area with the largest system throughput as the new fourth area, and repeating Step E to Step G until the difference between the system throughputs calculated by two adjacent times is less than a preset value; and
  Step H: determining a center location corresponding to a system throughput calculated last time as the location with the largest system throughput in the three-dimensional simulated environment.

5. A non-transitory storage medium, wherein the storage medium stores a computer program, and the computer program causes an intelligent base station with capability to identify three-dimensional environment to perform the method according to claim 1.

6. A method for determining a location of an intelligent base station with capability to identify three-dimensional environment, comprising:
  acquiring environment information of an environment in which the intelligent base station is located, and identifying texture information and location information of each scatterer in the environment in which the intelligent base station is located according to the environment information;
  performing a three-dimensional reconstruction on the environment in which the intelligent base station is located according to the texture information and the location information, to obtain a three-dimensional simulated environment;
  determining communication quality parameters in the three-dimensional simulated environment, wherein the communication quality parameters comprise channel interference values; and
  determining a location with a smallest channel interference value according to the communication quality parameters, and determining the location with the smallest channel interference value as a location of the intelligent base station;
  wherein the determining a location with a smallest channel interference value, comprises:
  Step A: dividing a first area corresponding to the three-dimensional simulated environment into a plurality of second areas, and determining a center location of each second area;
  Step B: calculating the channel interference value at the center location of each second area;
  Step C: determining a second area with a smallest channel interference value, taking the second area with the smallest channel interference value as the new first area, and repeating Step A to Step C, until the difference between the channel interference values calculated by two adjacent times is less than a preset value; and
  Step D: determining the center location corresponding to the channel interference value calculated last time as the location with the smallest channel interference value in the three-dimensional simulated environment.

* * * * *